(12) United States Patent
Shibata

(10) Patent No.: US 9,189,545 B2
(45) Date of Patent: Nov. 17, 2015

(54) CONTENT SUMMARIZING APPARATUS AND CONTENT SUMMARIZING DISPLAYING APPARATUS

(75) Inventor: Tomoyuki Shibata, Tokyo (JP)

(73) Assignee: Kabushiki Kaisha Toshiba, Minato-ku, Tokyo (JP)

(*) Notice: Subject to any disclaimer, the term of this patent is extended or adjusted under 35 U.S.C. 154(b) by 108 days.

(21) Appl. No.: 13/071,580

(22) Filed: Mar. 25, 2011

(65) Prior Publication Data

US 2012/0078977 A1    Mar. 29, 2012

(30) Foreign Application Priority Data

Sep. 27, 2010   (JP) .................................. 2010-215833

(51) Int. Cl.
*G06F 3/00*       (2006.01)
*G06F 17/30*      (2006.01)
*H04N 21/234*     (2011.01)
*H04N 21/8549*    (2011.01)

(52) U.S. Cl.
CPC .... *G06F 17/30793* (2013.01); *G06F 17/30837* (2013.01); *H04N 21/23418* (2013.01); *H04N 21/8549* (2013.01)

(58) Field of Classification Search
CPC ................... G06F 17/30843; G06F 17/30029; G06F 17/30056
USPC ......................................................... 715/730
See application file for complete search history.

(56) References Cited

U.S. PATENT DOCUMENTS

| | | | |
|---|---|---|---|
| 5,604,849 A * | 2/1997 | Artwick et al. ................ | 345/423 |
| 5,838,330 A * | 11/1998 | Ajima ............................ | 345/427 |
| 7,475,092 B2 * | 1/2009 | Rothschild ............................. | 1/1 |
| 2002/0093591 A1 * | 7/2002 | Gong et al. .................... | 348/515 |
| 2003/0122863 A1 * | 7/2003 | Dieberger et al. ............. | 345/730 |

(Continued)

FOREIGN PATENT DOCUMENTS

| | | |
|---|---|---|
| JP | 2005-65185 | 3/2005 |
| JP | 2006-221479 | 8/2006 |

(Continued)

OTHER PUBLICATIONS

V.N. Vapnik, "*The Nature of Statistical Leading Theory*", Springer, 1995, pp. 132-161.

Japanese Office Action (with English translation) dated Aug. 21, 2012 from corresponding JP Patent Application No. 2010-215833, 5 pages.

(Continued)

*Primary Examiner* — Cheyne D Ly
(74) *Attorney, Agent, or Firm* — Ohlandt, Greeley, Ruggiero & Perle, L.L.P.

(57) ABSTRACT

According to one embodiment, a content summarizing apparatus includes a selection unit, a record unit, and a storage unit. The selection unit selects at least one image from input content in accordance with at least one selection criterion and at least one parameter corresponding to the at least one selection criterion, and to produce a summary. The record unit cause the storage unit to store a summary record information item that includes the at least one selection criterion and the at least one parameter used by the selection unit. The storage unit stores the summary record information item whenever the summary of the input content is produced. The selection unit acquires past summary record information items from the storage unit, and produces the summary using the at least one selection criterion and the at least one parameter that fails to be included in the past summary record information items.

13 Claims, 3 Drawing Sheets

(56) References Cited

U.S. PATENT DOCUMENTS

| | | | |
|---|---|---|---|
| 2004/0003056 A1* | 1/2004 | Yamaguchi et al. | 709/219 |
| 2006/0067578 A1* | 3/2006 | Fuse | 382/190 |
| 2006/0095976 A1* | 5/2006 | Torres et al. | 726/28 |
| 2006/0139462 A1* | 6/2006 | Fukasawa et al. | 348/231.3 |
| 2007/0124679 A1* | 5/2007 | Jeong et al. | 715/723 |
| 2007/0299688 A1* | 12/2007 | Braz et al. | 705/2 |
| 2008/0319640 A1* | 12/2008 | Fujita et al. | 701/200 |
| 2011/0222785 A1 | 9/2011 | Hirohata et al. | 382/224 |

FOREIGN PATENT DOCUMENTS

| | | |
|---|---|---|
| JP | 2007-4767 | 1/2007 |
| JP | 2007-184674 | 7/2007 |
| JP | 2010-252291 A | 11/2010 |

\* cited by examiner

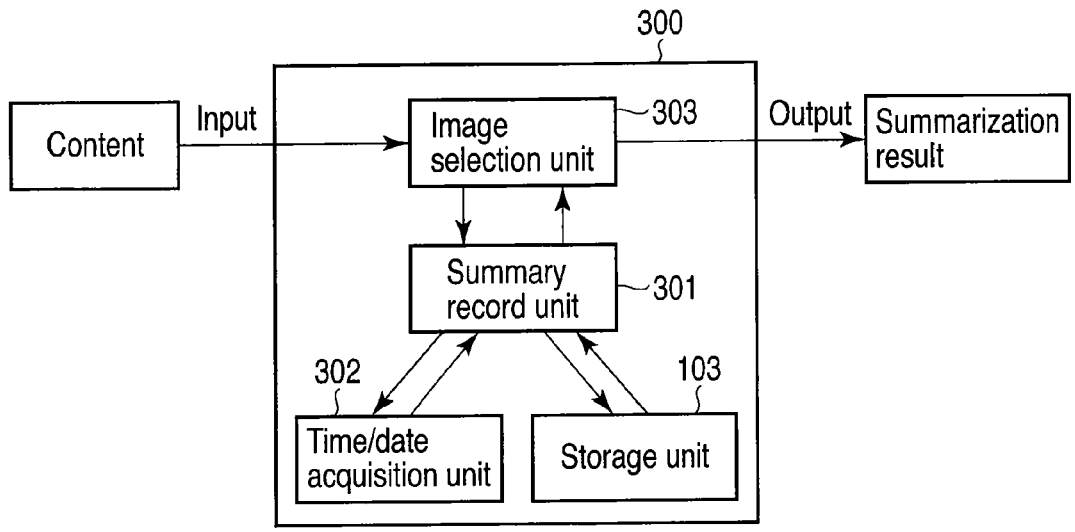
F I G. 3
| Month | Scenery |
|---|---|
| 1 | Rising sun |
| 2 | Snow |
| 3 | Tender green |
| 4 | Flower (cherry blossom) |
| 5 | Mountain |
| 6 | Rain |
| 7 | Sea |
| 8 | Sky |
| 9 | Cloud (madder red cloud) |
| 10 | Autumn leaves |
| 11 | Fallen leaves |
| 12 | Night view |
F I G. 4

CONTENT SUMMARIZING APPARATUS AND CONTENT SUMMARIZING DISPLAYING APPARATUS

CROSS-REFERENCE TO RELATED APPLICATIONS

This application is based upon and claims the benefit of priority from Japanese Patent Application No. 2010-215833, filed Sep. 27, 2010; the entire contents of which are incorporated herein by reference.

FIELD

Embodiments described herein relate generally to a content summarizing apparatus and a content summarizing/displaying apparatus.

BACKGROUND

Conventional content summarizing apparatuses generate one optimal summarized slide show, and cannot provide different summarization results even if the same content is processed several times.

In the conventional apparatuses, since images selected based on one image selection criterion are summarized, more than one summary cannot be produced as mentioned above. Only one summary will soon make viewers bored.

BRIEF DESCRIPTION OF THE DRAWINGS

FIG. 3 is an exemplary block diagram showing a content summarizing apparatus according to a second embodiment;

FIG. 4 is an exemplary view showing a table in which dates and scenes are associated;

DETAILED DESCRIPTION

Content summarizing apparatuses according to embodiments will be described in detail with reference to the accompanying drawings. In the following embodiments, like reference numbers denote like elements, and no duplicate description will be given thereof assuming that the like elements perform like operations.

In general, according to one embodiment, a content summarizing apparatus includes a selection unit, a record unit, and a storage unit. The selection unit selects at least one image from input content in accordance with at least one selection criterion and at least one parameter corresponding to the at least one selection criterion, and to produce a summary. The record unit cause the storage unit to store a summary record information item that includes the at least one selection criterion and the at least one parameter used by the selection unit. The storage unit stores the summary record information item whenever the summary of the input content is produced. The selection unit acquires past summary record information items from the storage unit, and produces the summary using the at least one selection criterion and the at least one parameter that fails to be included in the past summary record information items.

(First Embodiment)

Figure 1:
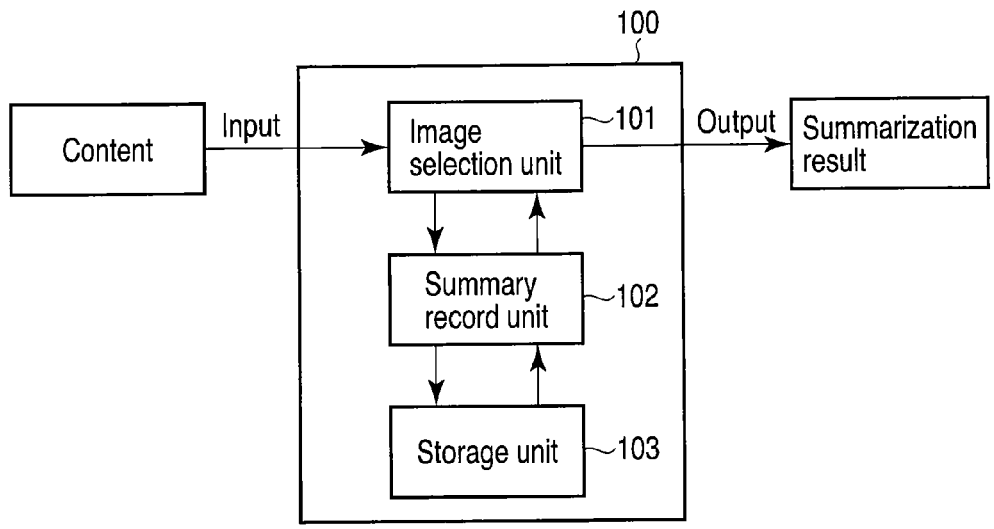
FIG. 1 is an exemplary block diagram showing a content summarizing apparatus according to a first embodiment.

Referring first to FIG. 1, a content summarizing apparatus 100 according to a first embodiment will be described.

The content summarizing apparatus 100 comprises an image selection unit 101, a summary record unit 102 and a storage unit 103.

The image selection unit 101 receives content, and changes at least one image selection criterion used for summarizing the content, and at least one parameter for determining the at least one selection criterion, based on past summary record data sent from the summary record unit 102. The image selection unit 101 receives, from the summary record unit 102, the selection criterion or criteria employed for producing the last slide show or the several past slide shows, the parameter(s) for the criterion (criteria), and the feature vector (s) needed for determining the criterion (criteria). After that, at least one selection criterion to be currently used, at least one parameter for determining the at least one criterion, and at least one feature vector corresponding thereto are determined so that each of them will not be identical to at least one of the preceding ones used in the preceding slide show or in the past several slide shows. Based on the thus-determined at least one selection criterion, at least one parameter and at least one feature vector, images are selected from the content. Assume here that the content in the embodiments is a moving image or a set of images.

The image selection unit 101 comprises, for example, a plurality of selection engines for selecting images, and uses at least one of the engines to select images from the content. The summary record unit 102 sends, to the image selection unit 101, the past summary record data stored in the storage unit 103, and causes the image selection unit 101 to send to and store in the storage unit 103 at least one selection criterion used for a current slide show, and at least one parameter corresponding thereto, and at least one feature vector corresponding thereto.

Further, the image selection unit 101 may change the selection criterion (criteria), the parameter(s) for determining the criterion (criteria) and the corresponding feature vector(s), whenever a slide show is produced. Yet further, for different images contained in the content, different selection criteria, different parameter corresponding thereto and different feature vectors corresponding thereto may be employed.

The storage unit 103 stores summary record data. For each of the summaries sequentially produced for a certain content item, summary record data is managed as a set of at least one feature vector extracted from all processed images and needed for at least one selection criterion used for summarization, the at least one selection criterion used, and at least one parameter for determining the at least one selection criterion. The same processing as this can be made on a plurality of content items. The storage unit 103 sequentially stores the past summary record data thus obtained and sent from the summary record unit 102.

The image selection unit 101 selects a plurality of images used to produce a slide show that is a summary of content externally supplied as a processing target, and produces a content-summarized slide show. The number of images to be selected depends upon the length of the produced slide show. For instance, when producing a summary slide show of one minute, ten images, for example, are selected. One or more selection criteria are selected from the group consisting of, for example, 1. a criterion based on face recognition, 2. a criterion based on the degree of smiling, 3. a criterion based on scene recognition, 4. a criterion based on the degree of similarity between images, 5. a criterion based on person detection, 6. a criterion based on the degree of sharpness of an image, etc. Further, in the initial summarization, the feature vectors necessary for all selection criteria may be extracted from all processed images and be sent as summary information to the summary record unit 102, for subsequent summarizations. For one content item, the image selection unit 101 uses different selection engines to produce different slide shows. The number of images per a summary slide show is not restricted to a particular number. Further, it is not necessary to hold a constant interval for changing an image to another image, i.e. the interval may be valuable.

<1. Face Recognition>

In a method using the selection criterion based on face recognition, the face areas of various persons are detected in images, and clustering is executed to classify the detected face areas into clusters corresponding to respective persons, whereby images that contain, for example, a target person who appears most frequently are selected. Face recognition can be realized by, for example, the techniques disclosed in JP-A 2007-004767 (KOKAI) and JP-A 2006-221479 (KOKAI). More specifically, a person can be identified based on, for example, the similarity between feature vectors which represent characteristics of faces. If the image selection unit 101 changes a target person whenever a slide show is produced, different slide shows can be produced.

<2. Smile Recognition>

In a method using the selection criterion based on smile recognition, a CoHOG feature vector is extracted, as in the above-mentioned face recognition, from each face area detected in each input image. Based on the extracted CoHOG feature vector, the likelihood of the smile of said each detected face area is estimated using a classifier (see Support Vector Machines (SVM) (V. N. Vapnik, The Nature of Statistical Learning Theory, Springer, 1995)). The classifier pre-stores, by learning associated with "2-class problem," data indicating whether each of beforehand collected images is a smile face image or a non-smile face image. From the input images thus processed using the classifier, those including face areas of higher likelihood of smile faces are selected. If the image selection unit 101 selects images in accordance with each estimated likelihood of smile faces whenever a slide show is produced, different slide shows can be produced. If, for example, the image selection unit 101 selects images that contain a smiling person or no smiling person, different slide shows can be produced. Alternatively, if the image selection unit 101 selects images in which the estimated likelihoods of smile faces falls within a preset range, and if it changes the range of likelihood to select images, different slide shows can be produced.

<3. Scene Recognition>

In a method using the selection criterion based on scene recognition, the above-mentioned CoHOG feature vector is extracted from the entire portion of one input image or from the areas into which each input image is divided, and the likelihood of similarity of each input image with respect to a predefined scene category (such as the sea, mountain, sky, forest, sunset, beach, cherry blossom, flower and snow) is estimated, whereby images are selected in a decreasing order of likelihood, using each likelihood estimated for each category based on the entire content. The likelihood of similarity of each input image with respect to each category is calculated, using a k-nearest-neighbor classifier in which CoHOG feature vectors were extracted, as in the case of the input images, from each of the several tens of hundreds of images beforehand collected for each category, and learning was found a metric for providing maximum classification performance and generalization performance is optimized. The image selection unit 101 can produce different slide shows using different scene categories.

<4. Similarity Between Images>

In a method using the selection criterion based on similarity between images, the above-mentioned CoHOG feature vector is extracted from the entire portion of one input image or from the areas into which each input image is divided, and clustering is executed based on the distances between feature vectors, and respective images are selected from the thus-produced clusters. If, for example, the image selection unit 101 changes parameter k to produce a slide show when performing clustering using k-means clustering, or if the image selection unit 101 randomly selects images from the clusters, different slide shows can be produced. Alternatively, the image selection unit 101 may project each CoHOG feature vector into low-dimensional feature vector, and select images using the thus-projected low-dimensional feature vector. In this case, the image selection unit 101 projects each CoHOG feature vector so that, for example, the distance between images will correspond to a distance (metric) faithful to the intuition of humans.

<5. Person Detection>

In a method using the selection criterion based on person detection, the above-mentioned CoHOG feature vector is extracted from the entire portion of one input image or from several areas into which each input image is divided, and a person area in each input image, the likelihood of similarity of which with respect to a corresponding learned person area is not less than a threshold value, is detected in each input image using a classifier (SVM) for discriminating a person area from a non-person area by pre-learning. If, for example, the image selection unit 101 selects images in which a greatest number of person areas are detected, or images with no person areas, or images in which a person area is detected in the middle, different slide shows can be produced.

<6. Sharpness of Image>

In a method using the selection criterion based on the sharpness of image, input images are selected in a decreasing order of sharpness, based on the sharpness that were calculated by executing a frequency analysis on the entire portion of one input image, or on each face area detected by face detection, or on each person area detected by person detection. If the image selection unit 101 selects input images including those of different values of sharpness, different slide shows can be produced.

The above-described different selection criterion methods can be combined in an arbitrary manner under the control based on the summary record information managed for each content item by the summary record unit 102. For instance, in the initial slide show, the method based on face recognition is combined with the method based on smile degree, and images of a most frequently appearing person with a broad smile are selected, while in the subsequent slide show, images of the person with a low degree of similarity with respect to the images used in the initial slide show are selected. Thus, different image selection criteria are employed in those slide shows. Alternatively, in the initial slide show, the method based on the person detection may be employed, and images each including many person areas be selected, while in the subsequent slide show, images with no person areas be selected.

Thus, the same selection criterion may be used with the parameter varied. Since the above-described six criteria (1. face recognition, 2. smile recognition, 3. scenery, 4. similarity between images, 5. person detection, 6. image sharpness) are independent of each other, there exist 720 (=6!) permutations. If a selection criterion different from that employed in a preceding occasion is employed whenever a slide show is produced, slide shows of all different features can be produced.

The summary record unit 102 manages the summary record information of input content. For each of the summaries sequentially produced for a certain content item, summary record data is managed as a set of at least one feature vector extracted from all processed images and needed for at least one selection criterion used for summarization, the at least one selection criterion used, and at least one parameter for determining the at least one selection criterion. The same processing as this can be made on a plurality of content items. The summary record unit 102 sends, to the image selection unit 101, the summary record data requested by the image selection unit 101, and receives therefrom the current summary record information to store the same in the storage unit 103.

The storage unit 103 stores and accumulates the summary record information managed by the summary record unit 102. Further, the summary record information is stored as databases corresponding to respective content items.

Figure 2:
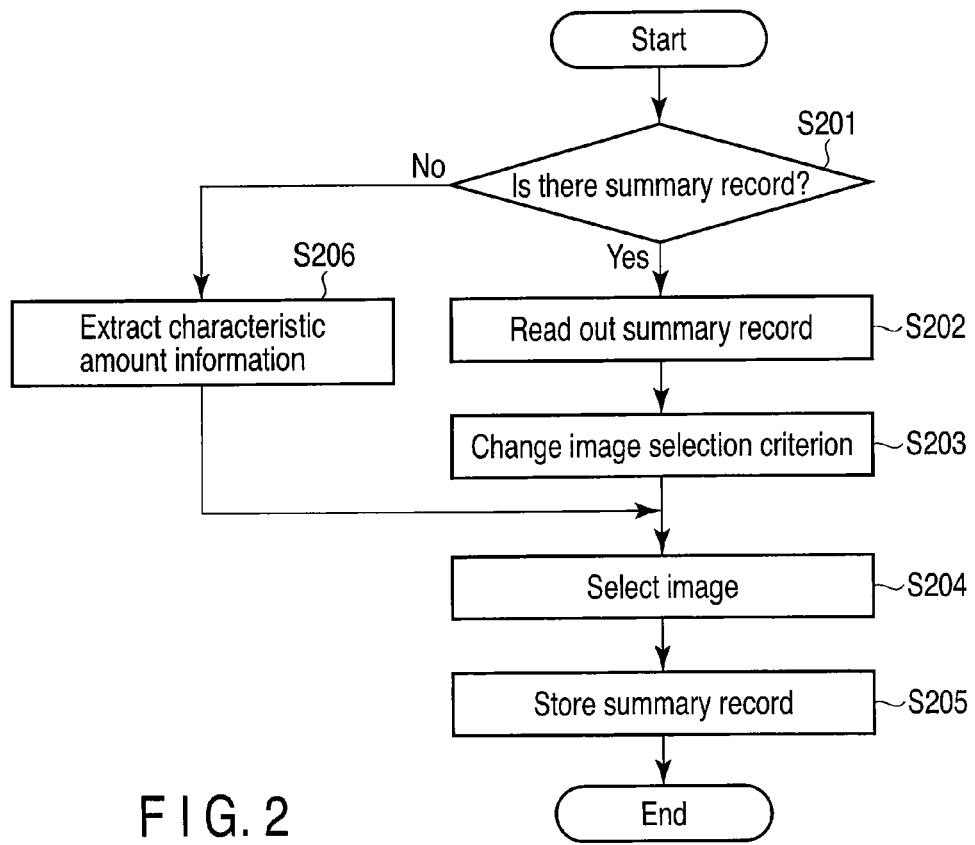
FIG. 2 is an exemplary flowchart useful in explaining an operation example of the content summarizing apparatus according to the first embodiment.

Referring now to FIGS. 1 and 2, a description will be given of the operation of the content summarizing apparatus 100 according to the first embodiment. FIG. 2 is a flowchart useful in explaining the operation of the content summarizing apparatus 100 of the first embodiment.

At step S201, the summary record unit 102 confirms whether the summary record information accumulated in the storage unit 103 includes that of the input content. If it is included, the program proceeds to step S202, whereas if it is not included, the program proceeds to step S206.

At step S206, the image selection unit 101 extracts, from all images of the input content, feature vectors necessary for all selection criteria, and then the program proceeds to step S204.

At step S202, the summary record unit 102 reads, from the storage unit 103, summary record information corresponding to the input content, and then the program proceeds to step S203.

At step S203, the summary record unit 102 changes the image selection criterion set at the image selection unit 101 to a selection criterion different from the preceding one, based on the past summary record information. The image selection unit 101 changes the selection criterion as an initial value to that set by the summary record unit 102. The program then proceeds to step S204.

At step S204, the image selection unit 101 extracts, from the input content, images based on the currently set image selection criterion, thereby producing a summarized slide show. After the summarization result is output to the outside of the apparatus, the program then proceeds to step S205.

At step S205, the summary record unit 102 stores, in the storage unit 103, the above-mentioned summary record information such as the currently used image selection criterion, followed by the termination of the process.

As described above, in the first embodiment, a summary different from a past one can be produced from the same content by changing a selection criterion based on a plurality of previously accumulated summary record information items, when summarizing a moving image or a set of images.

(Second Embodiment)

Referring then to FIG. 3, a description will be given of a content summarizing apparatus 300 according to a second embodiment.

The content summarizing apparatus 300 differs from the content summarizing apparatus 100 in that the former further comprises a time/date acquisition unit 302. The elements of the content summarizing apparatus 300 similar to those of the content summarizing apparatus 100 will not be described in detail.

An image selection unit 303 selects, from the content externally given as a processing target, a plurality of images used for producing a content-summarized slide show, and produces a summarized slide show. The image selection unit 303 changes the image selection criterion based on the summary record information, and also changes the selection criterion and the corresponding parameter, used for summarization performed within a threshold time period, to different ones based on the time/date information included in the summary record information. Selection criterion change indicates change of the image selection method itself, and also indicates change of only the parameter with the image selection method unchanged. If the time elapsing from the time/date when the preceding slide show was produced is longer than a threshold value, it may be considered that there was no preceding slide show, and the image selection unit 303 produces a slide show by an arbitrary method.

A summary record unit 301 manages the summary record information of input content. For each of the summaries sequentially produced for a certain content item, summary record data is managed as a set of data indicating the time and date when the certain content item was summarized, which is determined based on the time/date information acquired from the time/date acquisition unit 302, at least one feature vector extracted from all processed images and needed for at least one selection criterion used for summarization, the at least one selection criterion used, and at least one parameter for determining the at least one selection criterion. The same processing as this can be made on a plurality of content items.

The time/date acquisition unit 302 acquires information indicating the current time and date. The time/date acquisition unit 302 acquires the time and date requested by the summary record unit 301, and outputs the same thereto. This time and date is set as that of, for example, producing a slide show.

The image selection unit 303 selects images based on the time/date information obtained from the time/date acquisition unit 302. If, for example, the time obtained from the time/date acquisition unit 302 indicates morning, the image selection unit 303 selects images that give uplifted feeling. Thus, images are selected in accordance with the acquired time, date, season, etc. The image selection unit 303 comprises, for example, a table in which the time and date is associated with the properties of images, and selects an image from the table in accordance with the acquired time and date. More specifically, the image selection unit 303 comprises, for example, the table shown in FIG. 4, and selects, from the table, an image including the scenery corresponding to the acquired time and date.

Figure 5:
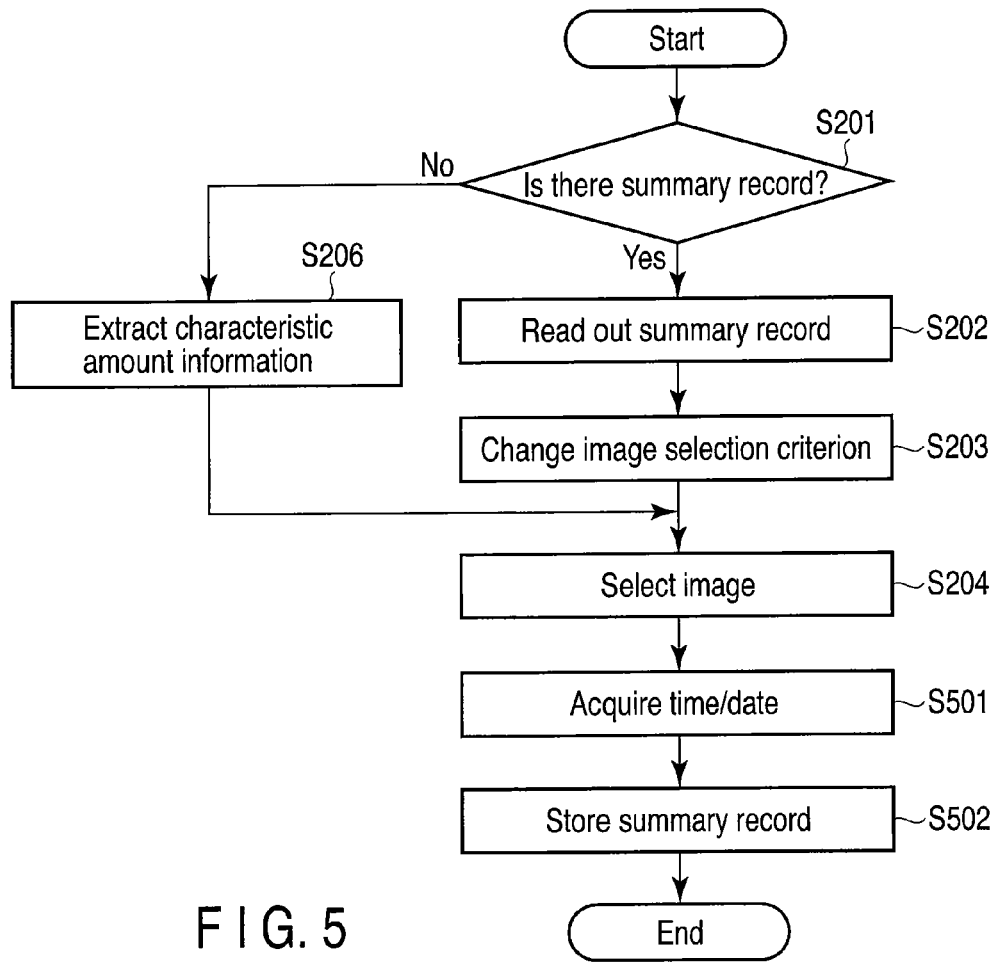
FIG. 5 is an exemplary flowchart useful in explaining an operation example of the content summarizing apparatus according to the second embodiment.

Referring to FIGS. 3 and 5, the operation of the content summarizing apparatus 300 according to the second embodiment will be described. FIG. 5 is a flowchart useful in explaining the operation of the content summarizing apparatus 300. Since steps S201 to S204 in FIG. 5 are the same as steps S201 to S204 in FIG. 2, no detailed description will be given thereof.

At step S501, the summary record unit 301 acquires time/date information from the time/date acquisition unit 302.

At step S502, the summary record unit 301 stores, as summary record information in the storage unit 103, the summary information, such as the image selection criterion, currently used in the image selection unit 101, and the time/date information acquired at step S501, followed by the termination of processing.

In the above-described second embodiment, when a moving image or a set of images are summarized, images are selected in accordance with the time and date when a user reproduces a slide show, with the result that optimal images for the reproduction time and date can be provided to the user, in addition to the advantage provided by the first embodiment.

(Third Embodiment)

Figure 6:
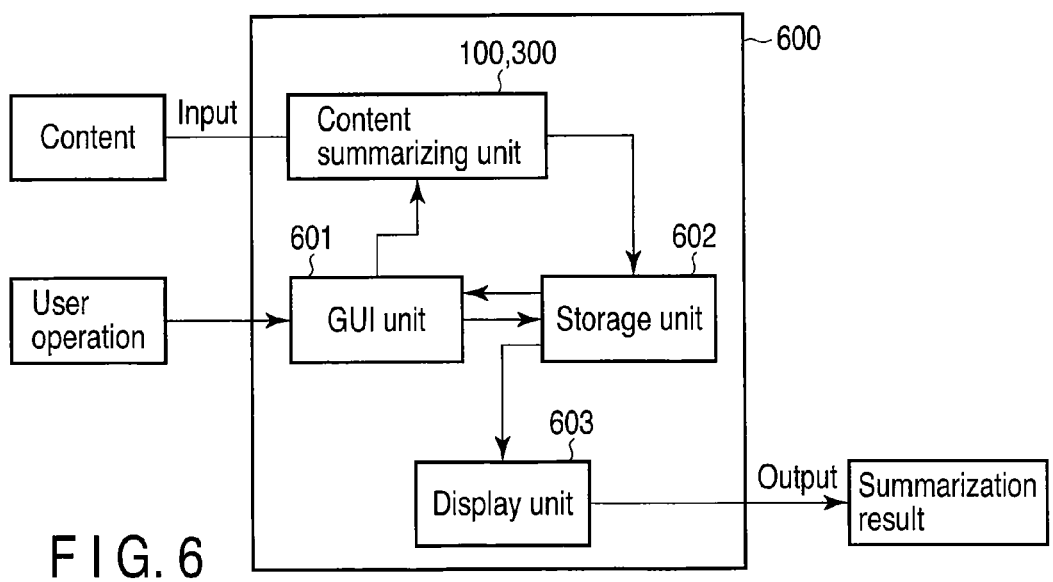
FIG. 6 is an exemplary block diagram showing a content summarizing apparatus according to a third embodiment.

A third embodiment relates to a content summarizing/displaying apparatus 600 that comprises first and second content summarizing units 100 and 300. Referring to FIG. 6, a description will be given of the content summarizing/displaying apparatus 600 according to the third embodiment. The content summarizing apparatus 600 is an apparatus for displaying a summarized slide show.

The content summarizing/displaying apparatus 600 comprises a graphical user interface (GUI) unit 601, a storage unit 602, a display unit 603 and content summarizing units 100 and 300.

The GUI unit 601 accepts a user operation from the outside. The storage unit 602 accumulates the summarized slide shows produced by the content summarizing units 100 and 300. The display unit 603 displays the summarization results (summarized slide shows).

The content summarizing/displaying apparatus 600 can select a desired summarized slide show via the GUI unit 601 from a plurality of summarized slide shows previously summarized and accumulated in the storage unit 602, and display it on the display unit 603. Further, the content summarizing/displaying apparatus 600 can permit the image selection criterion (criteria) used when the content summarizing units 100 and 300 summarize content to be externally designated, and can store the produced summarized slide shows in the storage unit 602 and then display them on the display unit 603.

The storage unit 602 stores the summarization results output from the content summarizing units 100 and 300, and supplies the display unit 603 with the summarized slide show designated via the GUI unit 601.

The display unit 603 reproduces produced slide shows or changes the content of display in accordance with a user operation sent via the GUI unit 601.

In the above-described third embodiment, past records can be referred to and selection criteria can be designated in accordance with a user's request, using the content summarizing apparatus of the first or second embodiment, and slide shows produced with the aforementioned advantages by the content summarizing apparatus of the first or second embodiment can be displayed.

For instance, user's tastes may well vary in accordance with physical or temporal variations, such as variations in time or place, or variations in conditions (i.e., whether a single user or a plurality of users see slide shows). Widely varied slide shows, which meet the variations, can be provided to the users by producing slide shows different from the past ones.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

As described above, the embodiments can provide content summarizing apparatuses and a content summarizing/displaying apparatus capable of producing summarization results different from the past ones.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A content summarizing apparatus comprising:
a selection unit configured to select at least one image from input content in accordance with at least one selection criterion, at least one parameter corresponding to the at least one selection criterion and a length of a produced input content summary, and to produce the summary; and
a record unit configured to cause a storage unit to store a summary record information item that includes the at least one selection criterion and the at least one parameter used by the selection unit, the storage unit storing the summary record information item whenever the summary of the input content is produced;
an acquisition unit configured to acquire a time and date when the summary is produced; and
a table storing the time and date in association with a scenery,
wherein the selection unit acquires past summary record information items from the storage unit, and produces the summary using the at least one selection criterion, a length of the produced summary, and the at least one parameter that are different from any one of criteria and parameters included in the past summary record information items,
the record unit includes the time and date in the summary record information item,
the selection unit selects, from the table, the scenery corresponding to the time and date acquired by the acquisition unit.

2. The apparatus according to claim 1, wherein
the at least one selection criterion and the at least one parameter used by the selection unit include a preset number of selection criteria and a preset number of parameters, respectively, the preset number of selection criteria and the preset number of parameters respectively differing from at least one criterion and at least one parameter included in a plurality of selection criteria and a plurality of parameters that are included in the past summary record information items, and the summary is produced using the preset number of selection criteria and the preset number of parameters.

3. A content summarizing/displaying apparatus comprising:
   a summary storage unit configured to store a summary produced by the content summarizing apparatus defined in claim 1;
   a graphical user interface configured to designate the summary of the content summarizing apparatus stored in the summary storage unit; and
   a display unit configured to display the summary of the content summarizing apparatus designated by the graphical user interface.

4. The apparatus according to claim 3, wherein the graphical user interface selects a selection criterion, from the at least one selection criterion, used by the content summarizing apparatus.

5. A content summarizing/displaying apparatus comprising:
   a storage unit configured to store a summary produced by the content summarizing apparatus defined in claim 2;
   a graphical user interface configured to designate the summary of the content summarizing apparatus stored in the storage unit; and
   a display unit configured to display the summary of the content summarizing apparatus designated by the graphical user interface.

6. The apparatus according to claim 5, wherein the graphical user interface selects a selection criterion, from the at least one selection criterion, used by the content summarizing apparatus.

7. A content summarizing method comprising:
   selecting at least one image from input content in accordance with at least one selection criterion, at least one parameter corresponding to the at least one selection criterion, and a length of a produced summary, and to produce the summary;
   causing a storage unit to store a summary record information item that includes the at least one selection criterion and the at least one parameter used for selecting the at least one image, the storage unit storing a summary record information item whenever the summary of the input content is produced;
   acquiring a time and date when the summary is produced; and
   storing in a table the time and date in association with a scenery,
   wherein the selecting of the at least one image acquires past summary record information items from the storage unit, and produces the summary using the at least one selection criterion, a length of the produced summary, and the at least one parameter that are different from any one of criteria and parameters included in the past summary record information items,
   causing the storage unit to store the time and date in the summary record information item, and
   selecting the at least one image, from the table, the scenery corresponding to the time and date.

8. The method according to claim 7, wherein
   the at least one selection criterion and the at least one parameter include a preset number of selection criteria and a preset number of parameters, respectively, the preset number of selection criteria and the preset number of parameters respectively differing from at least one criterion and at least one parameter included in a plurality of selection criteria and a plurality of parameters that are included in the past summary record information items, and
   the summary is produced using the preset number of selection criteria and the preset number of parameters.

9. A content summarizing/displaying method comprising:
   storing in the storage unit the summary produced by the content summarizing method defined in claim 8;
   designating the summary stored in the storage unit; and
   displaying the summary designated by a graphical user interface.

10. The method according to claim 9, wherein the graphical user interface selects a selection criterion, from the at least one selection criterion, used by the content summarizing method.

11. A content summarizing/displaying method comprising:
   storing in the storage unit the summary produced by the content summarizing method defined in claim 7;
   designating the summary stored in the storage unit; and
   displaying the summary designed by a graphical user interface.

12. The method according to claim 11, wherein the graphical user interface selects a selection criterion, from the at least one selection criterion, used by the content summarizing method.

13. A content summarizing apparatus comprising:
   a selection unit configured to select at least one image from input content in accordance with one or more selection criteria, at least one parameter corresponding to the one or more selection criteria and a length of a produced summary, and to produce the summary;
   a record unit configured to cause a storage unit to store a summary record information item that includes the one or more selection criteria and the at least one parameter used by the selection unit, the storage unit storing the summary record information item whenever the summary of the input content is produced;
   an acquisition unit configured to acquire a time and date when the summary is produced; and
   a table storing the time and date in association with a scenery,
   wherein the selection unit acquires past summary record information items from the storage unit, and produces the summary using the one or more selection criteria, the length, and the at least one parameter that are different from any one of criteria and parameters included in the past summary record information items, the one or more selection criteria being selected from a group consisting of a first criterion based on face recognition, a second criterion based on the degree of smiling, a third criterion based on scene recognition, a fourth criterion based on the degree of similarity between images, a fifth criterion based on person detection, and a sixth criterion based on the degree of sharpness of an image,
   the record unit includes the time and date in the summary record information item, and
   the selection unit selects, from the table, the scenery corresponding to the time and date acquired by the acquisition unit.

* * * * *